United States Patent
Terada et al.

(10) Patent No.: US 8,197,349 B2
(45) Date of Patent: Jun. 12, 2012

(54) SHOCK ABSORBING PROPELLER SHAFT APPARATUS FOR MOTOR VEHICLE

(75) Inventors: Eiichi Terada, Haga-gun (JP); Ryohei Osawa, Haga-gun (JP)

(73) Assignee: Showa Corporation, Saitama (JP)

( * ) Notice: Subject to any disclaimer, the term of this patent is extended or adjusted under 35 U.S.C. 154(b) by 267 days.

(21) Appl. No.: 12/716,073

(22) Filed: Mar. 2, 2010

(65) Prior Publication Data
US 2011/0077091 A1    Mar. 31, 2011

(30) Foreign Application Priority Data
Sep. 29, 2009  (JP) .................. 2009-225371

(51) Int. Cl.
*F16D 1/116*  (2006.01)

(52) U.S. Cl. ............. 464/182; 403/359.5; 403/DIG. 7; 464/906

(58) Field of Classification Search .......... 464/146, 464/182, 905, 906; 403/1, 10, 359.5, DIG. 7
See application file for complete search history.

(56) References Cited

U.S. PATENT DOCUMENTS
5,632,683 A * 5/1997 Fukumura et al. ............ 464/906

FOREIGN PATENT DOCUMENTS
DE   1 300 373    * 7/1969  ............... 464/146
GB   1105855     * 3/1968
JP   2008-132952    6/2006

* cited by examiner

*Primary Examiner* — Gregory Binda
(74) *Attorney, Agent, or Firm* — Babcock IP, PLLC

(57) ABSTRACT

In a shock absorbing propeller shaft apparatus for a motor vehicle, a stop ring is fitted to an annular groove provided in an outer periphery of an inner shaft end close to a base end with respect to a portion to which an inner race of a constant velocity joint in the inner shaft end is fitted, a collar main body of a collar is inserted to an outer periphery between a portion to which the inner race of the constant velocity joint in the inner shaft end is fitted and a portion to which the stop ring is fitted, in the outer periphery of the inner shaft end, and a flange portion protruding out in an axial direction from an outer diameter side of one end of the collar main body is attached to cover an outer periphery of the stop ring.

12 Claims, 9 Drawing Sheets

SHOCK ABSORBING PROPELLER SHAFT APPARATUS FOR MOTOR VEHICLE

BACKGROUND OF THE INVENTION

1. Field of the Invention

The present invention relates to a shock absorbing propeller shaft apparatus for a motor vehicle.

2. Description of the Related Art

As a shock absorbing propeller shaft apparatus for a motor vehicle, there is a structure in which first and second propeller shafts are coupled by a constant velocity joint, an inner shaft end is provided in the first propeller shaft, a tubular outer shaft end is provided in the second propeller shaft, and the inner shaft end of the first propeller shaft is fitted to the tubular outer shaft end of the second propeller shaft via the constant velocity joint, as described in Japanese Patent Application Laid-Open No. 2008-132952 (Patent Document 1).

In this shock absorbing propeller shaft for a motor vehicle, the inner shaft end in the first propeller shaft is spline-fitted to an inner race of the constant velocity joint and is locked in an axial direction. If a vehicle comes into collision, the inner shaft end of the first propeller shaft moves backward, and the inner race of the constant velocity joint provided in the inner shaft end in the manner mentioned above moves to a sliding motion limit position (a closed end of a race groove) in the tubular outer shaft end of the second propeller shaft. Then, the locking in the axial direction mentioned above between the inner shaft end and the inner race is exposed to a load so as to be released, and the inner shaft end moves further backward while leaving the inner race within the tubular outer shaft end, and absorbs a shock caused by the collision.

In this case, in the shock absorbing propeller shaft apparatus for a motor vehicle, a shock absorbing portion is formed in the tubular outer shaft end of the second propeller shaft, and a leading end of the inner shaft end mentioned above moves further backward while leaving the inner race within the tubular outer shaft end, breaks the shock absorbing portion and further absorbs the shock caused by the collision.

SUMMARY OF THE INVENTION

An object of the present invention is to set an appropriate load level from which a lock in an axial direction between a inner shaft end of a first propeller shaft and an inner race of a constant velocity joint is released at a time when a vehicle comes into collision and the first propeller shaft is pushed out backward, thereby attaining stable shock absorption, in a shock absorbing propeller shaft apparatus for a motor vehicle.

In a first aspect of the invention, there is provided a shock absorbing propeller shaft apparatus for a motor vehicle, comprising: first and second propeller shafts coupled by a constant velocity joint; a inner shaft end provided in the first propeller shaft; and a tubular outer shaft end provided in the second propeller shaft, the inner shaft end of the first propeller shaft fitted to the tubular outer shaft end of the second propeller shaft via the constant velocity joint. A shaft spline provided in the inner shaft end in the first propeller shaft is fitted to a hole spline provided in an inner race of the constant velocity joint. A stop ring is fitted to an annular groove provided in an outer periphery of the inner shaft end close to a base end with respect to a portion to which the inner race of the constant velocity joint in the inner shaft end is fitted. A collar main body of a collar is inserted to an outer periphery of the inner shaft end between the portion to which the inner race of the constant velocity joint in the inner shaft end is fitted and a portion to which the stop ring is fitted, and a flange portion protruding out in an axial direction from an outer diameter side in one end of the collar main body is attached to cover an outer periphery of the stopring. A stop ring is attached to an annular groove provided in an outer periphery of the inner shaft end close to a leading end with respect to the portion to which the inner race of the constant velocity joint in the inner shaft end is fitted. The inner race of the constant velocity joint is held and fixed from both sides in the axial direction between the other end of the collar main body of the collar and the stop ring.

In accordance with the present invention, the following operations and effects can be obtained.

(a) When the vehicle comes into collision, the inner shaft end of the first propeller shaft moves backward, and the inner race of the constant velocity joint provided in the inner shaft end moves to the sliding motion limit position (the closed end of the race groove) within the tubular outer shaft end of the second propeller shaft, the stop ring locking in the axial direction to the inner race via the collar main body of the collar climbs up the groove side surface of the annular groove by being exposed to the load in the axial direction, and deforms so as to expand the flange portion of the collar holding the stop ring from the outer peripheral side. The stop ring is expanded when the flange portion of the collar does not hold the stop ring any longer, and is disconnected from the annular groove, and the locking in the axial direction between the inner shaft end and the inner race is released. The load F which is applied to the first propeller shaft when the vehicle comes into collision and releases the locking in the axial direction between the inner shaft end and the inner race as mentioned above is determined based on the groove depth d of the annular groove, the angle of gradient a of the groove side surface, the thickness t and the hardness of the flange portion of the collar, and presence or absence of the stop ring and/or the C-shaped slit of the collar, as is apparent from a result of experiment shown in FIGS. 9 and 10, and it is possible to appropriately set the load F by combining these values, and to stabilize the shock absorption.

In a second aspect of the invention, there is provided an oil lock apparatus of the shock absorbing propeller shaft apparatus for a motor vehicle according to the first aspect, wherein the annular groove, which is provided in the outer periphery close to the base end of the inner shaft end and to which the stop ring is fitted, is provided in an outer periphery of the shaft spline provided in the inner shaft end.

In accordance with the present invention, the following operations and effects can be obtained.

(b) The annular groove which is provided in the outer periphery close to the base end of the inner shaft end and to which the stop ring is fitted is provided in the outer periphery of the shaft spline provided in the inner shaft end. This facilitates forming of the annular groove in the inner shaft end, and simplifies the structure of the inner shaft end.

In a third aspect of the invention, there is provided an oil lock apparatus of the shock absorbing propeller shaft apparatus for a motor vehicle according to the first and second aspects, wherein a groove side surface of the annular groove which is provided in the outer periphery close to the base end of the inner shaft end and to which the stop ring is fitted, the groove side surface being positioned on an opposed side to the inner race of the constant velocity joint with respect to the stop ring is formed as an inclined surface having an acute angle with respect to a center axis extending toward a base end side from a leading end side of the inner shaft end.

In accordance with the present invention, the following operations and effects can be obtained.

(c) The groove side surface of the annular groove which is provided in the outer periphery close to the base end of the inner shaft end and to which the stop ring is fitted, the groove side surface being positioned on the opposed side to the inner race of the constant velocity joint with respect to the stop ring, forms the inclined surface having the acute angle a with respect to the center axis extending toward the base end side from the leading end side of the inner shaft end. Accordingly, the stop ring is structured so as to smoothly climb up the inclined surface having a given gradient of the groove side surface of the annular groove, and it is possible to highly accurately set the load F releasing the locking in the axial direction between the inner shaft end and the inner race, and to further stabilize the shock absorption.

In a forth aspect of the invention, there is provided an oil lock apparatus of the shock absorbing propeller shaft apparatus for a motor vehicle according to the first to third aspects, wherein a cap press-fit portion is formed in the tubular outer shaft end of the second propeller shaft, and a leading end of the inner shaft end is capable of breaking the cap press-fit portion when the first and second propeller shafts are exposed to a shock force, the inner shaft end pushes the tubular outer shaft end, and the stop ring fitted to the annular groove provided in the outer periphery close to the base end of the inner shaft end pushes open a flange portion of the collar so as to be disconnected from the annular groove.

In accordance with the present invention, the following operations and effects can be obtained.

(d) When the cap press-fit portion is formed in the tubular outer shaft end of the second propeller shaft, the first and second propeller shafts are exposed to the shock force, the inner shaft end pushes the tubular outer shaft end, and the stop ring fitted to the annular groove provided in the outer periphery close to the base end of the inner shaft end pushes open the flange portion of the collar so as to be disconnected from the annular groove, the leading end of the inner shaft end can break the cap press-fit portion. Accordingly, after the locking in the axial direction between the inner shaft end and the inner race is released as mentioned above, the leading end of the inner shaft end moving further backward while leaving the inner race within the tubular outer shaft end breaks the cap press-fit portion, and further absorbs the shock caused by the collision.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Figures 1A, 1B:
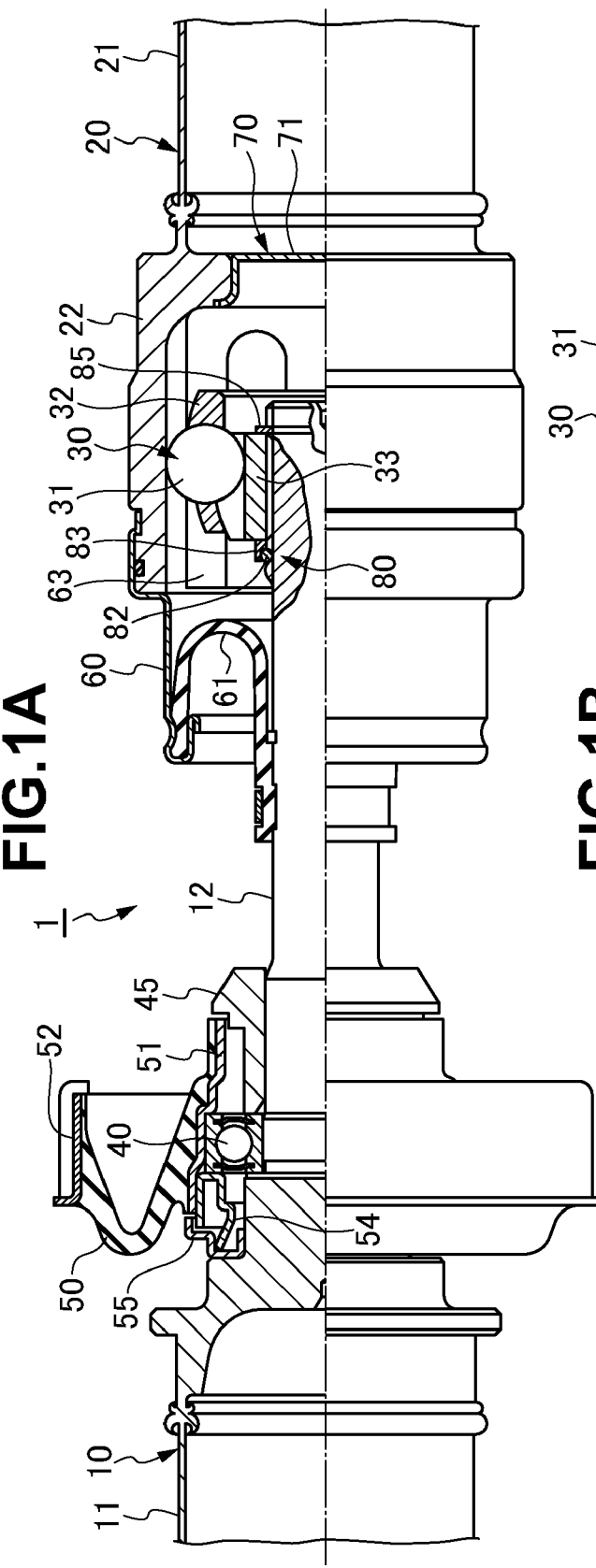
FIG. 1A is a cross sectional view and FIG. 1B is an enlarged cross sectional view of a main part showing a normal state of a propeller shaft apparatus.
Figure 2:
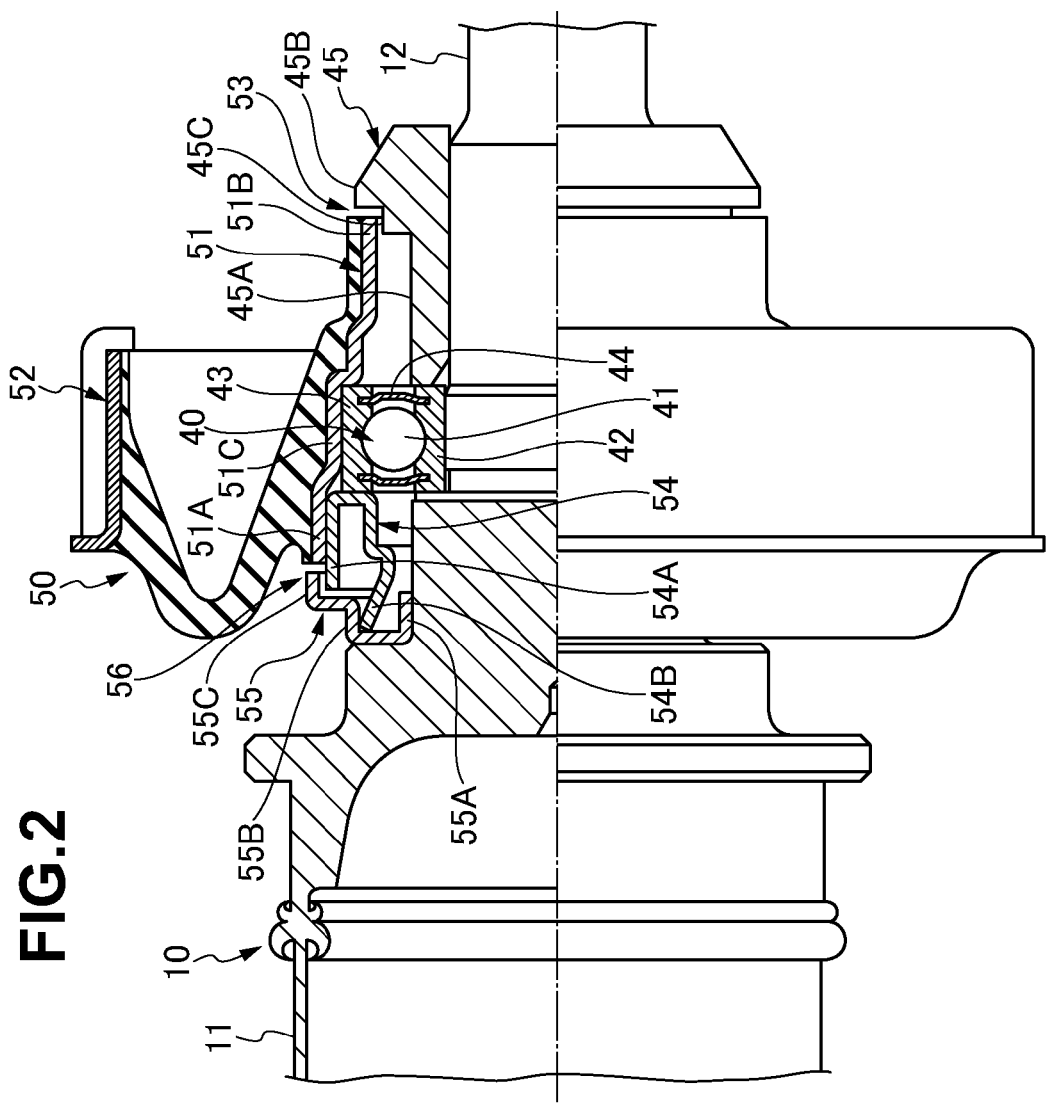
FIG. 2 is a cross sectional view showing a support portion of a first propeller shaft.
Figure 3:
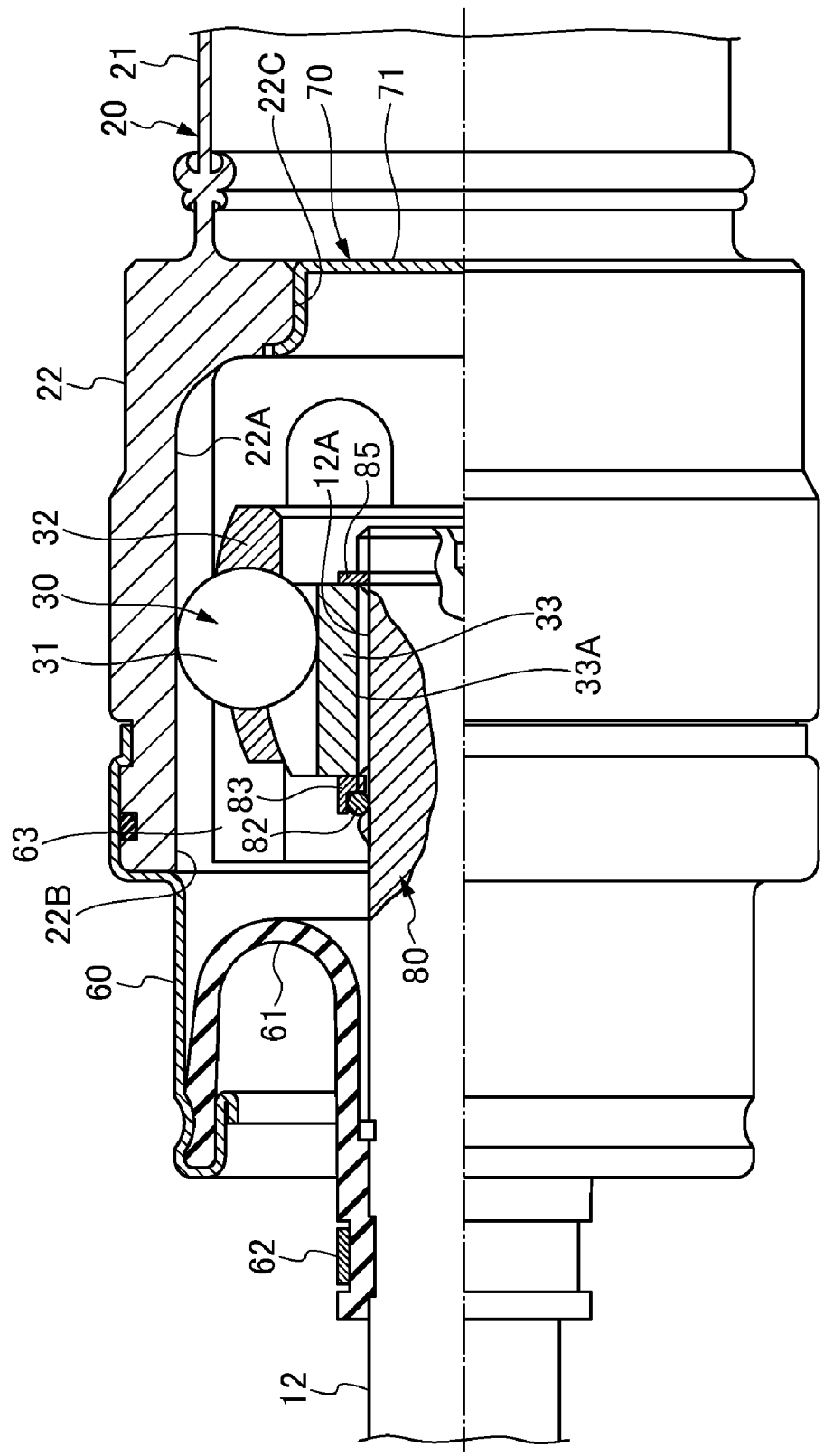
FIG. 3 is a cross sectional view showing a constant velocity joint portion.

A shock absorbing propeller shaft apparatus 1 for a motor vehicle is a coupled body of a plurality of divided first and second propeller shafts 10, 20 and the like, as shown in FIGS. 1A to 3, and a part thereof is structured, for example, such that the propeller shaft 10 on an engine side and the propeller shaft 20 on a rear wheel side are coupled by a constant velocity joint 30, and the propeller shaft 10 is rotatably supported to a vehicle body by a center bearing 40.

Figure 7:
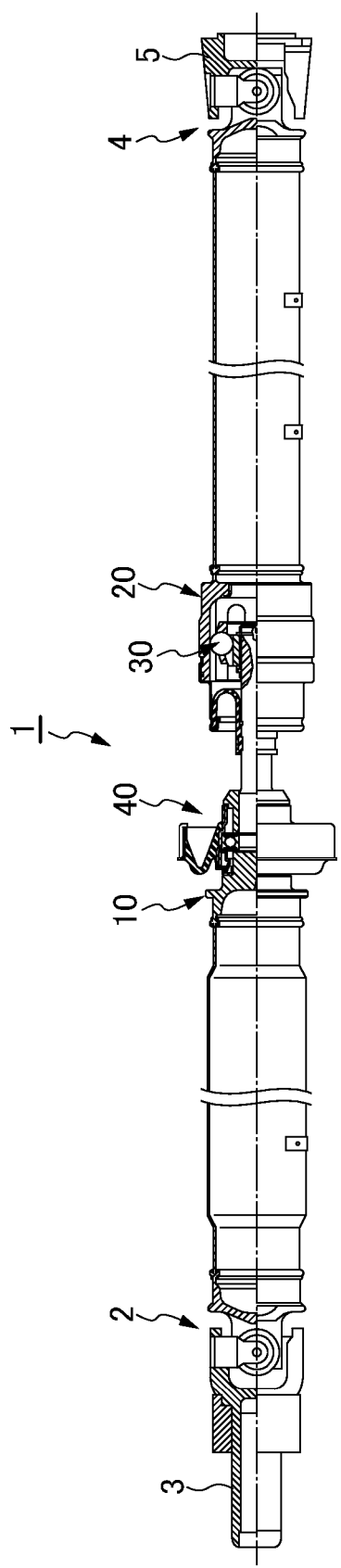
FIG. 7 is a schematic view showing a whole structure of the propeller shaft apparatus.

In this case, as shown in FIG. 7, a front end portion of the first propeller shaft 10 is coupled to a coupling yoke 3 connected to an output shaft of a transmission on the engine side via a universal joint 2. A rear end portion of the second propeller shaft 20 is coupled to a coupling yoke 5 connected to a differential gear via a universal joint 4.

The first propeller shaft 10 is provided with a inner shaft end 12 in one end portion of a hollow pipe 11 by means of a friction welding. The second propeller shaft 20 is provided with a tubular outer shaft end 22 in one end portion of the hollow pipe 21 in accordance with a friction welding.

In the propeller shaft apparatus 1, a leading end portion of the inner shaft end 12 of the first propeller shaft 10 is fitted to the tubular outer shaft end 22 of the second propeller shaft 20 via a constant velocity joint 30. The constant velocity joint 30 has a ball 31, a ball cage 32 and an inner race 33, a shaft spline 12A in the leading end portion of the inner shaft end 12 is fitted and fixed to a hole spline 33A of the inner race 33 of the constant velocity joint 30, and the ball 31 of the constant velocity joint 30 is mounted on each of race grooves 22A provided at a plurality of positions in a circumferential direction of an inner periphery of the tubular outer shaft end 22 so that the ball 31 can roll thereon. It is possible to prevent the ball 31 of the constant velocity joint 30 from falling off outward from the race groove 22A, by attaching a stop ring to an opening 22B in the inner periphery provided with the race groove 22A of the tubular outer shaft end 22.

The inner shaft end 12 of the first propeller shaft 10 and the inner race 33 of the constant velocity joint 30 are locked in an axial direction by a locking structure 80 mentioned below. The locking between the inner shaft end 12 and the inner race 33 with this locking structure 80 is released by a given load in an axial direction pushing out the first propeller shaft 10 backward when the vehicle comes into collision as will be mentioned below.

In the propeller shaft apparatus 1, a base end portion of the inner shaft end 12 of the first propeller shaft 10 is supported by an inner ring 51 of a curved rubber-like elastic member 50 via the center bearing 40, and is supported by a support bracket on a vehicle body side via an outer ring 52 of the rubber-like elastic member 50. The center bearing 40 is provided with a ball 41, an inner ring 42, an outer ring 43, and a ball shield 44. The inner ring 42 of the center bearing 40 is held between an enlarged-diameter step portion provided in the base end portion of the inner shaft end 12, and a stopper piece 45 inserted and fixed to an outer periphery of the inner shaft end 12 from an intermediate portion side of the inner shaft end 12. The outer ring 43 of the center bearing 40 is inserted and fixed to an inner periphery of the inner ring 51 of the rubber-like elastic member 50.

In this case, the inner ring 51 of the rubber-like elastic member 50 is provided with a large diameter portion 51A on the base end portion side of the hollow pipe 11, a small diameter portion 51B on the intermediate portion side of the hollow pipe 11, and a middle diameter portion 51C between the large diameter portion 51A and the small diameter portion 51B. The outer ring 43 of the center bearing 40 is inserted to the middle diameter portion 51C of the inner ring 51, and a cross section of the outer ring 43 comes into contact with a step surface formed in a boundary between the small diameter portion 51B and the middle diameter portion 51C.

The stopper piece 45 is provided with a small outer diameter portion 45A in abutment with the inner ring 42 of the center bearing 40, a middle outer diameter portion 45C and a large outer diameter portion 45B which continues in this order from the small outer diameter portion 45A, an end surface of the large outer diameter portion 45B faces an end surface of the small diameter portion 51B of the inner ring 51 of the rubber-like elastic member 50 with a small gap therebetween, an outer peripheral surface of the middle outer diameter portion 45C faces to an inner peripheral surface of the small diameter portion 51B of the inner ring 51 of the rubberlike elastic member 50 with a small gap therebetween, and these small gaps constitute a labyrinth seal portion 53 with respect to the outside.

A seal metallic material 54 is attached to an inner side of the large diameter portion 51A of the inner ring 51 of the rubberlike elastic member 50. The seal metallic material 54 is formed by coaxially turning an inner tube portion 54B into an inner peripheral side of an outer tube portion 54A from one end turn-in portion of the outer tube portion 54A. The outer tube portion 54A of the seal metallic material 54 is inserted to an inner periphery of the large diameter portion 51A of the inner ring 51, and an end surface of the one-end turn-in portion of the seal metallic material 54 comes into contact with a step surface formed in a boundary between the large diameter portion 51A and the middle diameter portion 51C, and with an end surface of the outer ring 43 of the center bearing 40. A free end of the outer tube portion 54A of the seal metallic material 54 protrudes outward in an axial direction with respect to the large diameter portion 51A of the inner ring 51, and a free end of the inner tube portion 54B of the seal metallic material 54 protrudes outward in the axial direction with respect to the free end of the outer tube portion 54A. A dust cover 55 is attached to a side with respect to the large diameter portion 51A of the inner ring 51 of the rubberlike elastic member 50 and the seal metallic material 54, in a base end portion of the inner shaft end 12. The dust cover 55 has a small diameter portion 55A which is inserted to the base end portion of the inner shaft end 12, a middle diameter portion 55B which surrounds an outer periphery of the inner tube portion 54B of the seal metallic material 54 with a small gap therebetween, and a large diameter portion 55C which surrounds an outer periphery of the outer tube portion 54A of the seal metallic material 54 protruding outward with respect to the large diameter portion 51A of the inner ring 51 with a small gap between the large diameter portion 55c and the outer tube portion 54A, and faces an end surface of the large diameter portion 51A of the inner ring 51 with a small gap therebetween, and these small gaps constitute a labyrinth seal portion 56 with respect to the outside.

In the propeller shaft apparatus 1, respective end portions of a rubber boot 61 are attached to a metal tubular boot adapter 60 covering a leading end portion of the tubular outer shaft end 22 of the second propeller shaft 20, and to an approximately intermediate portion of the inner shaft end 12 of the first propeller shaft 10. The boot adapter 60 is opposed in an axial direction to the rubber-like elastic member 50 while being tightly attached to an outer periphery of the leading end portion of the tubular outer shaft end 22 via an O-ring, and holds one end portion of the rubber boot 61 in a leading end folded portion thereof. The other end portion of the rubber boot 61 is fixed to an attaching groove that is provided in an outer periphery of the intermediate portion of the inner shaft end 12 by a boot band 62. The boot adapter 60 and the rubber boot 61 seal a grease charging space 63 between the inner shaft end 12 and the tubular outer shaft end 22 for the constant velocity joint 30 with respect to the outside, and prevent a grease leakage and an intrusion of a muddy water from outside.

The propeller shaft apparatus 1 is structured such that a cap press-fit portion 70 is formed on the base end side of the tubular outer shaft end 22 of the second propeller shaft 20, and the cap press-fit portion 70 is breakable when the first propeller shaft 10 and the second propeller shaft 20 are contracted by being exposed to a shock force caused by the collision of the vehicle and the inner shaft end 12 pushes in the tubular outer shaft end 22. The cap press-fit portion 70 in accordance with the present embodiment is press fitted at a suitable load to a hole 22C which is provided in a portion to which the leading end surface of the inner shaft end 12 is opposed in the axial direction, in the base end portion of the tubular outer shaft end 22, and is formed of a plate (an annular cap sealing the grease charged in the grease charging space 63) 71 which is burst through by the inner shaft end 12, during the collision. A hole diameter of the hole 22C is smaller than an outer diameter of the ball cage 32 of the constant velocity joint 30, allows the inner shaft end 12 to pass through, and inhibits the constant velocity joint 30 from passing through. Accordingly, a size of the cap press-fit portion 70 on the base end side of the tubular outer shaft end 22 of the second propeller shaft 20 may be set to such a size that the shaft spline portion 12A of the inner shaft end 12 can pass through, and an inner diameter of the hollow pipe 21 coupled to the tubular outer shaft end 22 can be set to be such a minimum diameter that the shaft spline portion 12A of the inner shaft end 12 can pass through.

Further, in the propeller shaft apparatus 1, an outer diameter of the small diameter portion 51B of the inner ring 51 of the rubberlike elastic member 50 is made smaller than an inner diameter of the boot adapter 60, and is further made smaller than a diameter of the opening 22B of the tubular outer shaft end 22.

Further, in the propeller shaft apparatus 1, an outer diameter of the stopper piece 45 for the center bearing 40 is made smaller than the inner diameter of the boot adapter 60, and is further made smaller than the diameter of the opening 22B of the tubular outer shaft end 22.

Figure 8:
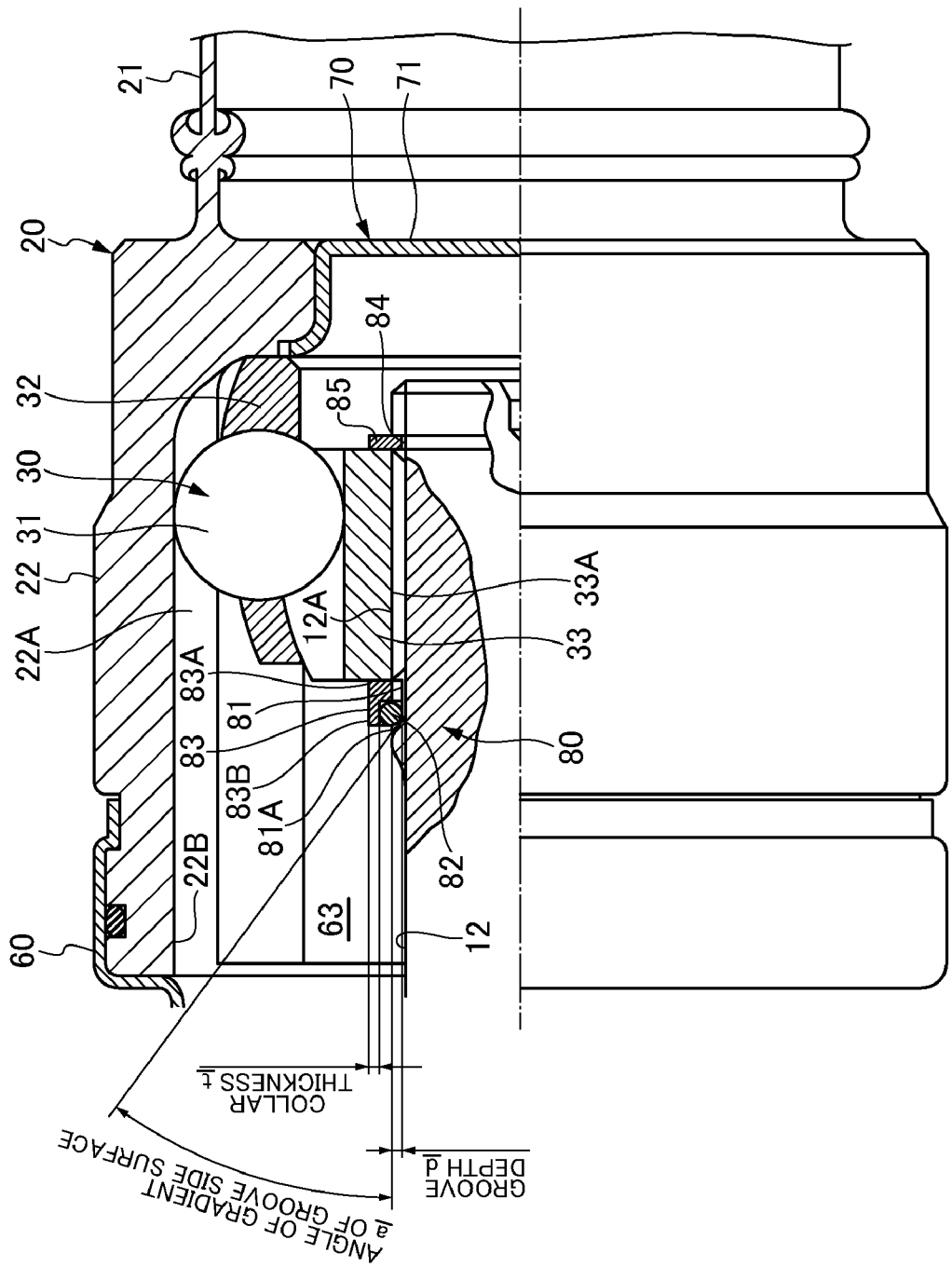
FIG. 8 is a cross sectional view showing an inner race locking structure of the propeller shaft apparatus.

A description will be given below of a locking structure 80 of the inner shaft end 12 of the first propeller shaft 10 and the inner race 33 of the constant velocity joint 30 (FIG. 8).

The locking structure 80 is provided with an annular groove 81 having a groove depth d in an outer periphery of the shaft spline 12A provided in the inner shaft end 12 close to a base end with respect to a portion to which the inner race 33 of the constant velocity joint 30 in the inner shaft end 12 is fitted, and a stop ring 82, for example, obtained by forming an element wire having a circular cross section to have a C-shape is fitted to the annular groove 81. In the present embodiment, a groove side surface 81A of the annular groove 81 positioned on an opposed side to the inner race 33 of the constant velocity joint 30 with respect to the stop ring 82 forms an inclined surface having an acute angle a with respect to a center axis extending toward the base end side from the leading end side of the inner shaft end 12.

The locking structure 80 is structured such that a collar main body 83A of a collar 83 obtained by forming a raw material having an L-shaped cross section as an annular shape (or a C-shape) is fitted to an outer periphery of the shaft spline 12A provided in the inner shaft end 12 between a portion to which the inner race 33 of the constant velocity joint 30 in the inner shaft end 12 is fitted, and a portion to which the stop ring 82 is fitted. Further, a flange portion 83B having a thickness t and protruding in an axial direction from an outer diameter side of one end of the collar main body 83A is attached to cover an outer periphery of the stop ring 82. The flange portion 83B has the same outer diameter as an outer diameter of the collar main body 83A and a larger inner diameter than an inner diameter of the collar main body 83A. The flange portion 83B is formed as an annular shape which is continuous in a circumferential direction from the collar main body 83A (alternatively, the flange portion 83B may be formed in an intermittent sinking comb shape in the circumferential direction of the collar main body 83A).

The locking structure 80 is provided with an annular groove 84 in an outer periphery of the shaft spline 12A provided in the inner shaft end 12 close to the leading end with respect to the portion to which the inner race 33 of the constant velocity joint 30 in the inner shaft end 12 is fitted, and a stop ring 85 such as a stop ring or the like having a C-shape or the like is attached to the annular groove 84.

The locking structure 80 holds and fixes the inner race 33 of the constant velocity joint 30 fitted to the shaft spline 12A of the inner shaft end 12 between the other end of the collar main body 83A of the collar 83 and the stop ring 85 mentioned above. A front end surface of the inner race 33 comes into contact with the collar main body 83A of the collar 83, and a rear end surface of the inner race 33 comes into contact with the stop ring 85.

In the locking structure 80, when the vehicle comes into collision, the inner shaft end 12 of the first propeller shaft 10 moves backward, and the inner race 33 of the constant velocity joint 30 provided in the inner shaft end 12 moves to a sliding motion limit position (the closed end of the race groove 22A) within the tubular outer shaft end 22 of the second propeller shaft 20, the stop ring 82 locking in the axial direction to the inner race 33 via the collar main body 83A of the collar 83 climbs up the groove side surface 81A of the annular groove 81 by being exposed to a load in the axial direction, thereby deforming so as to expand the flange portion 83B of the collar 83 holding the stop ring 82 from an outer peripheral side. The stop ring 82 is expanded when the flange portion 83B of the collar 83 does not hold the stop ring 82 any longer, and is disconnected from the annular groove 81, and the locking in the axial direction between the inner shaft end 12 and the inner race 33 is released.

A description will be given below of a shock absorbing motion of the propeller shaft apparatus 1.

(1) If the vehicle comes into collision and the engine or the transmission moves backward, the first propeller shaft 10 is pushed out backward from the normal state shown in FIGS. 1A and 1B.

(2) The load pushing out the first propeller shaft 10 backward pushes out the center bearing 40, the stopper piece 45 and the inner ring 51 together with the inner shaft end 12 backward while deforming the rubberlike elastic member 50.

Figure 4:
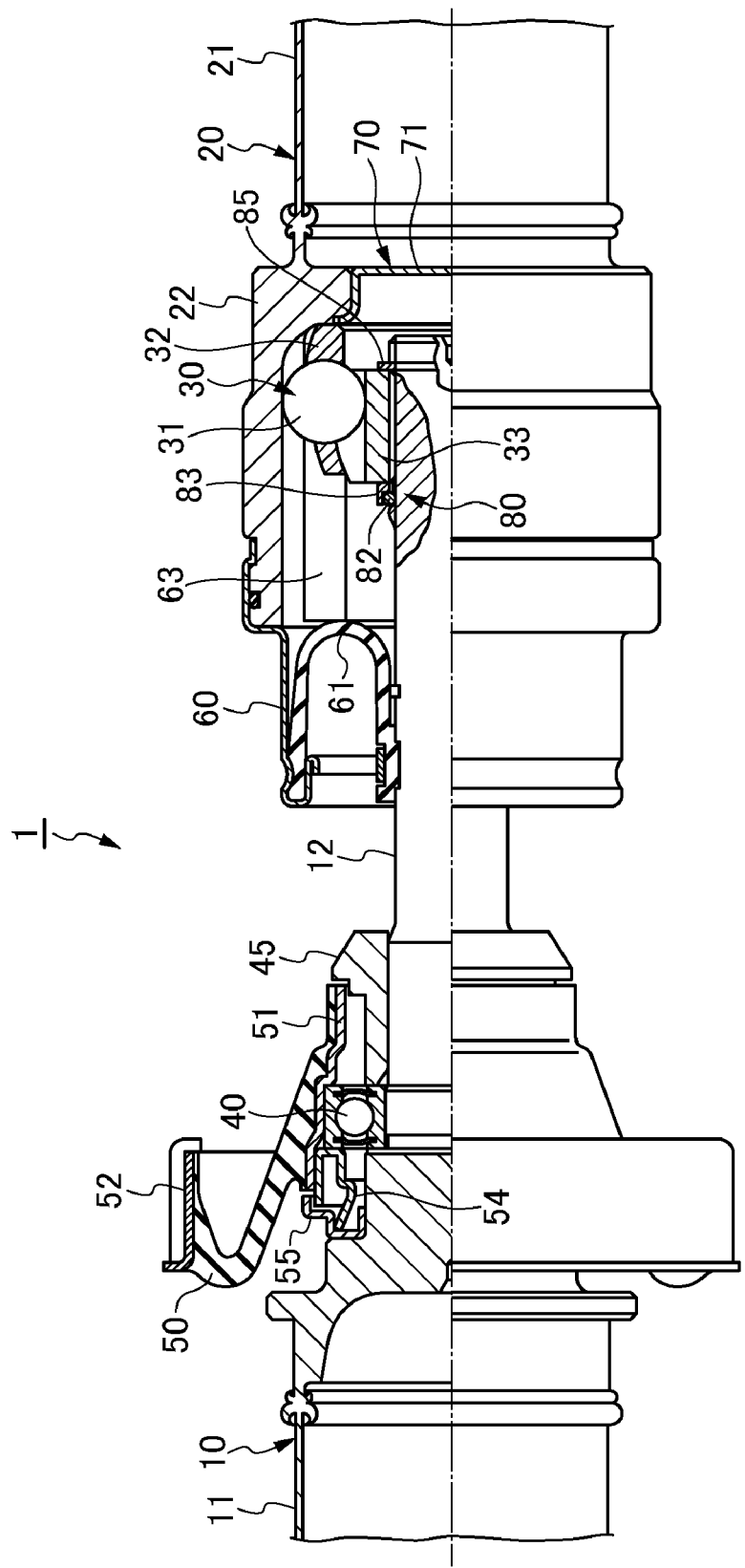
FIG. 4 is a cross sectional view showing a collision initial state of the propeller shaft apparatus.
Figure 5:
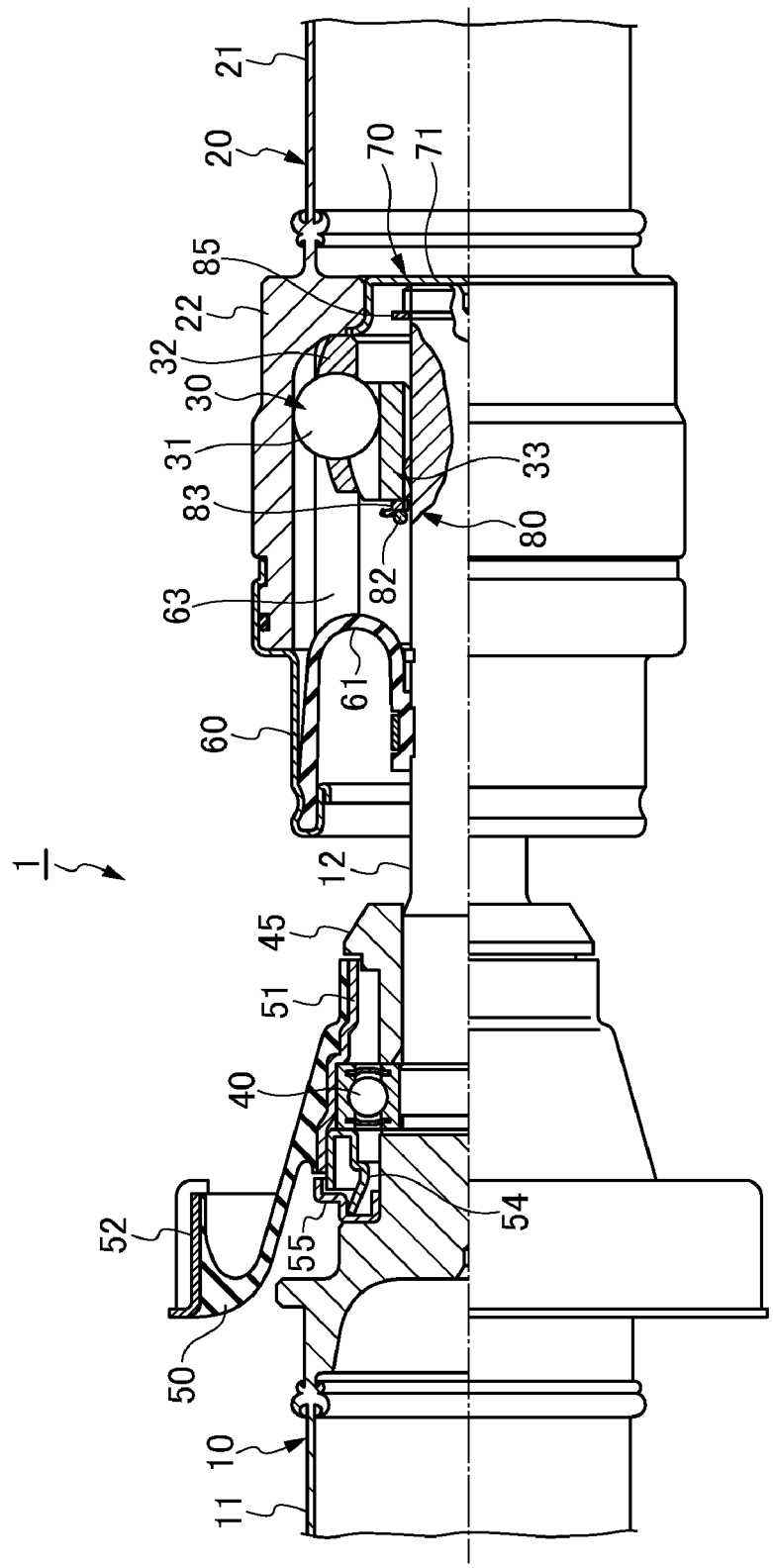
FIG. 5 is a cross sectional view showing a collision intermediate state of the propeller shaft apparatus.
Figure 6:
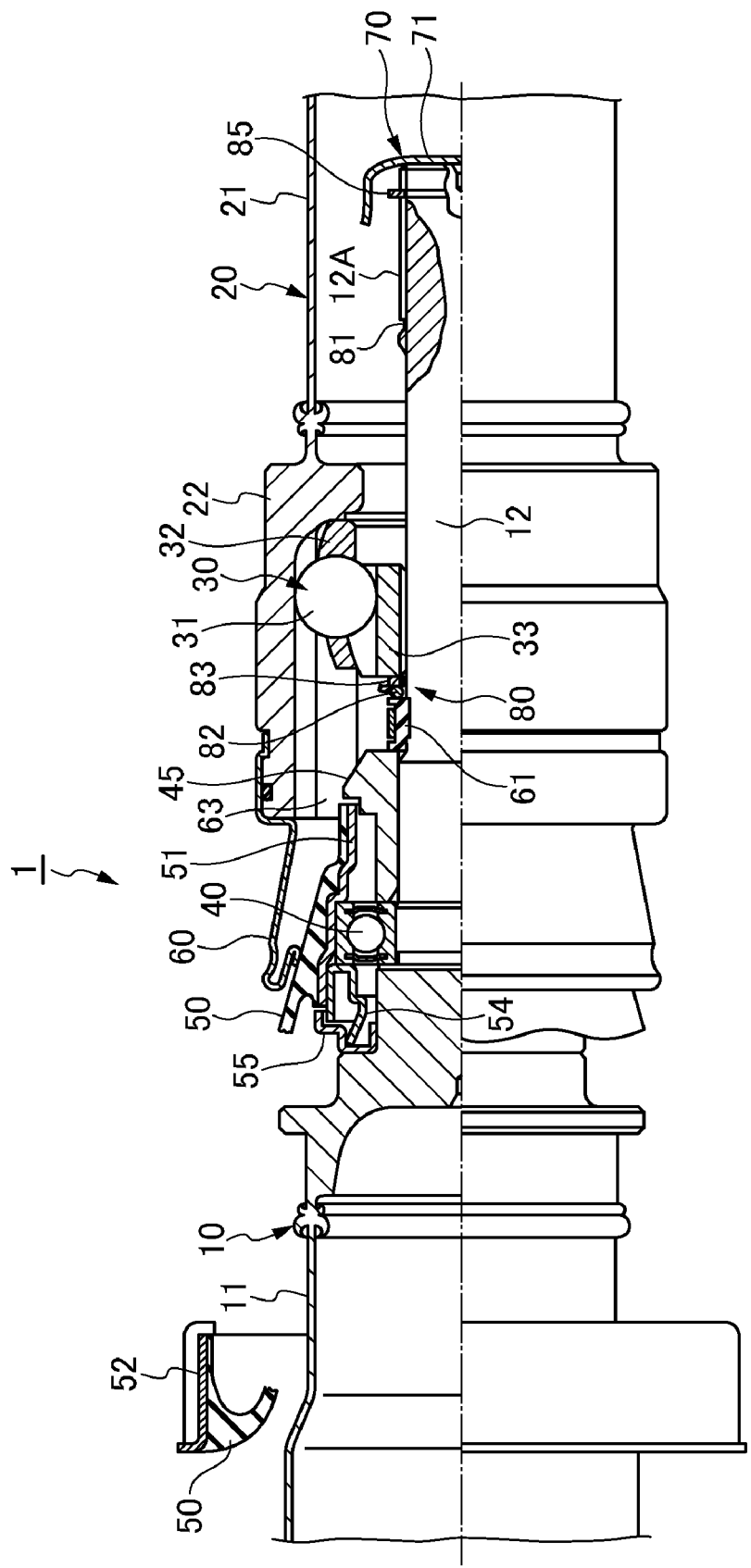
FIG. 6 is a cross sectional view showing a collision final state of the propeller shaft apparatus.

Note that FIGS. 4 to 6 omit an illustration of the deforming state of the rubber-like elastic member 50 for simplicity.

(3) If the inner shaft end 12 of the first propeller shaft 10 moves backward, the inner race 33 of the constant velocity joint 30 which is fixed to the leading end portion of the inner shaft end 12 via the stop ring 82 and the collar 83 of the locking structure 80 moves backward, and the inner race 33 moves to the sliding motion limit position corresponding to the closed end of the race groove 22A of the tubular outer shaft end 22 (FIG. 4).

(4) If the load pushing out the first propeller shaft 10 backward is further applied, the locking structure 80 fixing the inner shaft end 12 and the inner race 33 of the constant velocity joint 30 is released as mentioned above, the inner shaft end 12 is disconnected from the inner race 33, and the leading end portion of the inner shaft end 12 moves further backward while leaving the inner race 33 within the tubular outer shaft end 22 (FIG. 5). Further, the leading end portion of the inner shaft end 12 pushes out the cap press-fit portion 70 (the plate 71) of the base end portion of the tubular outer shaft end 22 from the hole 22C, and enters into the hollow pipe 21 through the hole 22C (FIG. 6).

(5) If the load pushing out the first propeller shaft 10 backward is further applied, the stopper piece 45 and the inner ring 51 which are provided on the outer peripheral side of the inner shaft end 12 get into the inner side of the boot adapter 60 and the opening 22B of the tubular outer shaft end 22 (FIG. 6). Further, the boot adapter 60 passes through the outer side of the inner ring 51. Further, the stopper piece 45 moves to a position holding the portion of the rubber boot 61 fixed to the inner shaft end 12 between the stopper piece 45 and the inner race 33 of the constant velocity joint 30 (FIG. 6).

In accordance with the present embodiment, the following operations and effects can be achieved.

Figure 9:
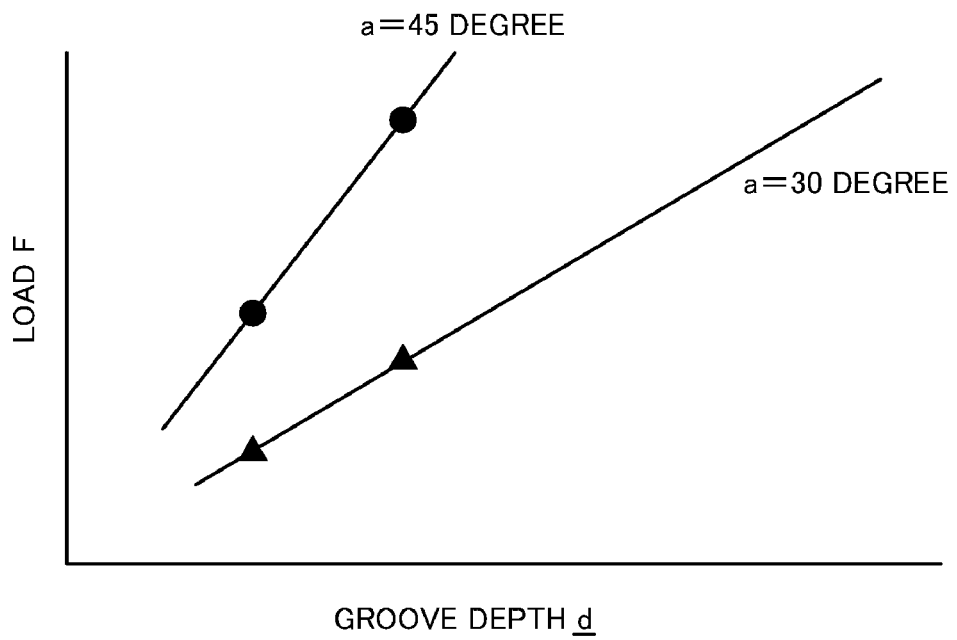
FIG. 9 is a graph showing a relationship among a groove depth of a fitting groove of a stop ring, an angle of gradient of a groove side surface and an inner race locking releasing load.
Figure 10:
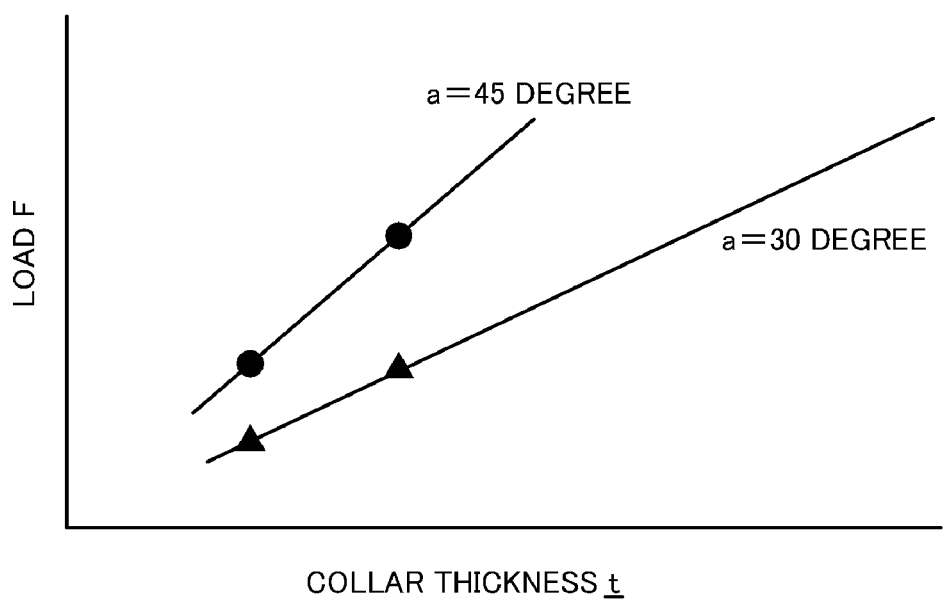
FIG. 10 is a graph showing a relationship among the angle of gradient of the groove side surface of the fitting groove of the stop ring, a thickness of a flange portion of a collar and the inner race locking releasing load.

(a) When the vehicle comes into collision, the inner shaft end 12 of the first propeller shaft 10 moves backward, and the inner race 33 of the constant velocity joint 30 provided in the inner shaft end 12 moves to the sliding motion limit position (the closed end of the race groove 22A) within the tubular outer shaft end 22 of the second propeller shaft 20, the stop ring 82 locking in the axial direction to the inner race 33 via the collar main body 83A of the collar 83 climbs up the groove side surface 81A of the annular groove 81 by being exposed to the load in the axial direction, and deforms so as to expand the flange portion 83B of the collar 83 holding the stop ring 82 from the outer peripheral side. The stop ring 82 is expanded when the flange portion 83B of the collar 83 does not hold the stop ring 82 any longer, and is disconnected from the annular groove 81, and the locking in the axial direction between the inner shaft end 12 and the inner race 33 is released. The load F which is applied to the first propeller shaft 10 when the vehicle comes into collision and releases the locking in the axial direction between the inner shaft end 12 and the inner race 33 as mentioned above is determined based on the groove depth d of the annular groove 81, the angle of gradient a of the groove side surface 81A, the thickness t and the hardness of the flange portion 83B of the collar 83, and presence or absence of the stop ring 82 and/or the C-shaped slit of the collar 83, as is apparent from a result of experiment shown in FIGS. 9 and 10, and it is possible to appropriately set the load F by combining these values, and to stabilize the shock absorption.

(b) The annular groove 81 which is provided in the outer periphery close to the base end of the inner shaft end 12 and to which the stop ring 82 is fitted is provided in the outer periphery of the shaft spline 12A provided in the inner shaft end 12. This facilitates forming of the annular groove 81 in the inner shaft end 12, and simplifies the structure of the inner shaft end 12.

(c) The groove side surface 81A of the annular groove 81 which is provided in the outer periphery close to the base end of the inner shaft end 12 and to which the stop ring 82 is fitted, the groove side surface 81A being positioned on the opposed side to the inner race 33 of the constant velocity joint 30 with respect to the stop ring 82, forms the inclined surface having the acute angle a with respect to the center axis extending toward the base end side from the leading end side of the inner shaft end 12. Accordingly, the stop ring 82 is structured so as to smoothly climb up the inclined surface having a given gradient of the groove side surface 81A of the annular groove 81, and it is possible to highly accurately set the load F releasing the locking in the axial direction between the inner shaft end 12 and the inner race 33, and to further stabilize the shock absorption.

(d) When the cap press-fit portion 70 is formed in the tubular outer shaft end 22 of the second propeller shaft 20, the first and second propeller shafts 10 and 20 are exposed to the shock force, the inner shaft end 12 pushes the tubular outer shaft end 22, and the stop ring 82 fitted to the annular groove 81 provided in the outer periphery close to the base end of the inner shaft end 12 pushes open the flange portion 83B of the collar 83 so as to be disconnected from the annular groove 81, the leading end of the inner shaft end 12 can break the cap press-fit portion 70. Accordingly, after the locking in the axial direction between the inner shaft end 12 and the inner race 33 is released as mentioned above, the leading end of the inner shaft end 12 moving further backward while leaving the inner race 33 within the tubular outer shaft end 22 breaks the cap press-fit portion 70, and further absorbs the shock caused by the collision.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. For example, the annular groove to which the stop ring is fitted in accordance with the present invention may be provided in an outer periphery of the inner shaft end where the shaft spline is not provided.

In accordance with the present invention, in the shock absorbing propeller shaft apparatus for a motor vehicle, the shaft spline provided in the inner shaft end in the first propeller shaft is fitted to the hole spline provided in the inner race of the constant velocity joint, the stop ring is fitted to the annular ring provided in the outer periphery of the inner shaft end close to the base end with respect to the portion to which the inner race of the constant velocity joint in the inner shaft end is fitted, the collar main body of the collar is inserted to the outer periphery of the inner shaft end between the portion to which the inner race of the constant velocity joint in the inner shaft end is fitted and the portion to which the stop ring is fitted, the flange portion protruding out in the axial direction from the outer diameter side of the one end of the collar main body is attached to cover the outer periphery of the stop ring, the stop ring is attached to the annular groove provided in the outer periphery of the inner shaft end close to the leading end with respect to the portion to which the inner race of the constant velocity joint in the inner shaft end is fitted, and the inner race of the constant velocity joint is held and fixed from both sides in the axial direction between the other end of the collar main body of the collar and the stop ring. Accordingly, in the shock absorbing propeller shaft apparatus for a motor vehicle, when the vehicle comes into collision, and the first propeller shaft is pushed out backward, it is possible to appropriately set the load releasing the locking in the axial direction between the inner shaft end of the first propeller shaft and the inner race of the constant velocity joint, and thus to stabilize the shock absorption.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A shock absorbing propeller shaft apparatus for a motor vehicle, comprising:
first and second propeller shafts being coupled by a constant velocity joint;
an inner shaft end provided in the first propeller shaft; and
a tubular outer shaft end provided in the second propeller shaft,
the inner shaft end of the first propeller shaft being fitted to the tubular outer shaft end of the second propeller shaft via the constant velocity joint, wherein a shaft spline provided in the inner shaft end in the first propeller shaft is fitted to a hole spline provided in an inner race of the constant velocity joint,
a stop ring is fitted to an annular groove provided in an outer periphery of the inner shaft end close to a base end with respect to a portion to which the inner race of the constant velocity joint in the inner shaft end is fitted,
a collar main body of a collar is inserted to an outer periphery of the inner shaft end between the portion to which the inner race of the constant velocity joint in the inner shaft end is fitted and a portion to which the stop ring is fitted,
and a flange portion protruding out in an axial direction from an outer diameter side in one end of the collar main body is attached to cover an outer periphery of the stop ring,
a stop ring is attached to an annular groove provided in an outer periphery of the inner shaft end close to a leading end with respect to the portion to which the inner race of the constant velocity joint in the inner shaft end is fitted,
the inner race of the constant velocity joint is held and fixed from both sides in the axial direction between the other end of the collar main body of the collar and the stop ring; and
a groove side surface of the annular groove which is provided in the outer periphery close to the base end of the inner shaft end and to which the stop ring is fitted, the groove side surface being positioned on an opposed side to the inner race of the constant velocity joint with respect to the stop ring is formed as an inclined surface having an acute angle with respect to a center axis extending toward a base end side from a leading end side of the inner shaft end.

2. The shock absorbing propeller shaft apparatus for a motor vehicle according to claim 1, wherein the annular groove, which is provided in the outer periphery close to the base end of the inner shaft end and to which the stop ring is fitted, is provided in an outer periphery of the shaft spline provided in the inner shaft end.

3. The shock absorbing propeller shaft apparatus for a motor vehicle according to claim 2, wherein a groove side surface of the annular groove which is provided in the outer periphery close to the base end of the inner shaft end and to which the stop ring is fitted, the groove side surface being positioned on an opposed side to the inner race of the constant velocity joint with respect to the stop ring is formed as an inclined surface having an acute angle with respect to a center axis extending toward a base end side from a leading end side of the inner shaft end.

4. The shock absorbing propeller shaft apparatus for a motor vehicle according to claim 3, wherein a cap press-fit portion is formed in the tubular outer shaft end of the second propeller shaft, and a leading end of the inner shaft end is capable of breaking the cap press-fit portion when the first and second propeller shafts are exposed to a shock force, the inner shaft end pushes the tubular outer shaft end, and the stop ring fitted to the annular groove provided in the outer periphery close to the base end of the inner shaft end pushes open a flange portion of the collar so as to be disconnected from the annular groove.

5. The shock absorbing propeller shaft apparatus for a motor vehicle according to claim 3, wherein the flange portion is provided with the same outer diameter as an outer diameter of the collar main body and a larger inner diameter than an inner diameter of the collar main body.

6. The shock absorbing propeller shaft apparatus for a motor vehicle according to claim 5, wherein the flange portion is formed as an annular shape which is continuous in a circumferential direction of the collar main body.

7. The shock absorbing propeller shaft apparatus for a motor vehicle according to claim 2, wherein a cap press-fit portion is formed in the tubular outer shaft end of the second propeller shaft, and a leading end of the inner shaft end is capable of breaking the cap press-fit portion when the first and second propeller shafts are exposed to a shock force, the inner shaft end pushes the tubular outer shaft end, and the stop ring fitted to the annular groove provided in the outer periphery close to the base end of the inner shaft end pushes open a flange portion of the collar so as to be disconnected from the annular groove.

8. The shock absorbing propeller shaft apparatus for a motor vehicle according to claim 2, wherein the flange portion is provided with the same outer diameter as an outer diameter of the collar main body and a larger inner diameter than an inner diameter of the collar main body.

9. The shock absorbing propeller shaft apparatus for a motor vehicle according to claim 8, wherein the flange portion is formed as an annular shape which is continuous in a circumferential direction of the collar main body.

10. The shock absorbing propeller shaft apparatus for a motor vehicle according to claim 1, wherein a cap press-fit portion is formed in the tubular outer shaft end of the second propeller shaft, and a leading end of the inner shaft end is capable of breaking the cap press-fit portion when the first and second propeller shafts are exposed to a shock force, the inner shaft end pushes the tubular outer shaft end, and the stop ring fitted to the annular groove provided in the outer periphery close to the base end of the inner shaft end pushes open a flange portion of the collar so as to be disconnected from the annular groove.

11. The shock absorbing propeller shaft apparatus for a motor vehicle according to claim 1, wherein the flange portion is provided with the same outer diameter as an outer diameter of the collar main body and a larger inner diameter than an inner diameter of the collar main body.

12. The shock absorbing propeller shaft apparatus for a motor vehicle according to claim 11, wherein the flange portion is formed as an annular shape which is continuous in a circumferential direction of the collar main body.

* * * * *